(12) United States Patent
McDougal et al.

(10) Patent No.: US 8,621,223 B2
(45) Date of Patent: Dec. 31, 2013

(54) DATA SECURITY METHOD AND SYSTEM

(75) Inventors: Monty D. McDougal, Plano, TX (US);
Jason E. Ostermann, Plano, TX (US);
Brian N. Smith, Richardson, TX (US)

(73) Assignee: Raytheon Company, Waltham, MA (US)

( * ) Notice: Subject to any disclaimer, the term of this patent is extended or adjusted under 35 U.S.C. 154(b) by 818 days.

(21) Appl. No.: 12/164,814

(22) Filed: Jun. 30, 2008

(65) Prior Publication Data

US 2009/0327733 A1    Dec. 31, 2009

(51) Int. Cl.
*H04L 9/32*    (2006.01)
(52) U.S. Cl.
USPC .......................................................... 713/176
(58) Field of Classification Search
USPC .......................................................... 713/176
See application file for complete search history.

(56) References Cited

U.S. PATENT DOCUMENTS

| | | | |
|---|---|---|---|
| 6,832,373 B2 * | 12/2004 | O'Neill | 717/171 |
| 2003/0110397 A1 * | 6/2003 | Supramaniam et al. | 713/201 |
| 2003/0208619 A1 * | 11/2003 | Rossbach et al. | 709/238 |
| 2003/0217281 A1 * | 11/2003 | Ryan | 713/200 |
| 2007/0033535 A1 * | 2/2007 | Cornacchia | 715/762 |

* cited by examiner

*Primary Examiner* — Cordelia Zecher
(74) *Attorney, Agent, or Firm* — Schwegman Lundberg & Woessner, P.A.

(57) ABSTRACT

A method of verifying integrity of a digital file includes receiving the digital file subsequent to exposure to a foreign environment and validating the digital file. The received digital file has an appended signature label that includes one or both of a first hash value and a digital signature. Validating the digital file includes hashing the digital file to obtain a second hash value, retrieving the first hash value from the signature label, and comparing the first hash value and second hash value.

18 Claims, 3 Drawing Sheets

DATA SECURITY METHOD AND SYSTEM

TECHNICAL FIELD

This disclosure relates in general to data and more particularly to a data security method and system.

BACKGROUND

A modern communication network such as a local area network ("LAN") allows users at a particular location who are connected to the LAN to easily share digital files and data with one another. To provide even more accessibility, a LAN may be connected to a larger, more global network such as a wide area network ("WAN") or the Internet. This allows users at a particular location to communicate and share digital files and data with users who are connected to a LAN at a remote location, provided the remote LAN is also connected to the larger network.

When sharing digital files and data between two separate locations that are connected via a larger, more global network such as a WAN or the Internet, it is possible for a malicious user to intercept and modify data and digital files that are sent between users. If the malicious user intercepts and modifies a digital file while it is being transmitted between locations, a user may not be aware of the modification once the digital file is finally received.

In addition, a particular LAN that is connected to a larger network may be located in an area that has a different security classification level from other LANs that are connected to the network. For example, one LAN connected to the larger network may be in a top secret location, while another LAN that is connected to the larger network is in an unclassified location.

SUMMARY OF THE DISCLOSURE

According to one embodiment, a method of verifying integrity of a digital file includes receiving the digital file subsequent to exposure to a foreign environment and validating the digital file. The received digital file has an appended signature label that includes one or both of a first hash value and a digital signature. Validating the digital file includes hashing the digital file to obtain a second hash value, retrieving the first hash value from the signature label, and comparing the first hash value and second hash value.

Technical advantages of certain embodiments may include providing data integrity and reliability checking on digital files after exposure to foreign environments via hashing functions. This results in increased dependability and trustworthiness of transmitted digital files and thus a reduction in user uncertainty. Other advantages may include providing authentication of digital data files via non-repudiation of digital signatures. Embodiments may eliminate certain inefficiencies such as manually verifying and validating transmitted digital files.

Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION OF THE DISCLOSURE

Digital files sent between networks having different security classification levels need to be validated to ensure the digital files and data have been authorized by the proper authorities to be released to a different security classification level.

Figure 1A:
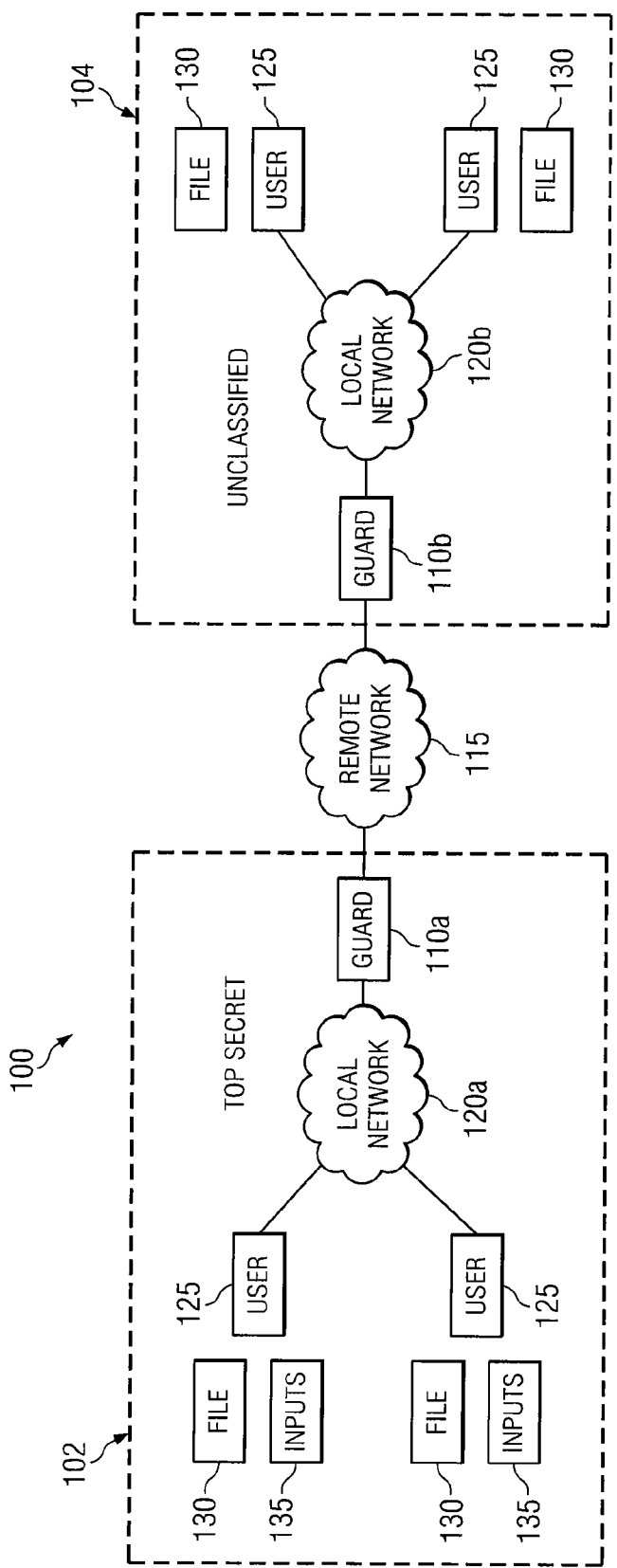
FIGS. 1A and 1B are simplified schematic diagrams illustrating systems where particular embodiments of this disclosure may be utilized.

FIG. 1A is a schematic diagram depicting a system 100 that may benefit from the teachings of the disclosure in order to provide data integrity and authentication functions for digital files transmitted between zones of different security classifications. System 100 includes at least two separate zones and/or locations such as a top secret zone 102 and an unclassified zone 104. System 100 also includes guards 110a and 110b, a remote network 115, local networks 120a and 120b, one or more users 125, one or more digital files 130, and user inputs 135. Guard 110a resides in top secret zone 102 and is coupled to remote network 115 and local network 120a. Guard 110b resides in unclassified zone 104 and is coupled to remote network 115 and local network 120b.

According to the teachings of the disclosure, guards 110 are provided to perform data integrity and authentication functions on digital files 130 that are sent from one network, such as local network 120a in top secret zone 102, to foreign networks, such as local network 120b in unclassified zone 104. A particular embodiment of guards 110 is described in detail below in reference to FIG. 1B.

In general, guards 110 act as gatekeepers by isolating local networks 120 from remote network 115. When digital file 130 is being transmitted from a local network 120 to remote network 115, guards 110 analyze and add one or more labels to digital file 130 prior to releasing digital file 130 to remote network 115. A particular embodiment of labels that may be added to digital files 130 is described in detail below in reference to FIGS. 2A and 2B, and a particular labeling method is described in reference to FIG. 3. When a digital file 130 is received from remote network 115, guards 110 analyze digital file 130 to determine if digital file 130 has been modified after being labeled. Guards 110 determine whether digital file 130 has been modified since being labeled by performing "validation" procedures on digital file 130. A particular validation method is described in detail below in reference to FIG. 4.

As depicted in FIG. 1A, system 100 includes users 125 in top secret zone 102 and unclassified zone 104. Top secret zone 102 and unclassified zone 104 may be, for example, an entire building, a group of buildings, a town, a base, a country, or any other particular area that has been designated a specific security classification level. Users 125 are communicatively coupled to local networks 120 and interact and/or communicate with guards 110. Users 125 may, for example, operate a computer that is coupled to local networks 120 in order to communicate with guards 110. During interaction with guards 110, users 125 may transmit digital files 130 and/or user inputs 135 to guards 110. Alternatively or additionally, user 125 may identify digital files 130 to guards 110 and may select from a predetermined set of user inputs 135 presented to users 125 from guards 110.

Digital files 130 may be any type of digital file and/or data including, but not limited to, spreadsheet files, text documents, database files, and the like. User inputs 135 may include parameters that are used by guard 110 in order to label digital file 130 prior to exposure to remote network 155, and to validate digital file 130 after exposure to remote network 155. Such parameters may include a public key, a private key, a password, a type of cryptographic hash, and/or a classification level of digital file 130. The public and private keys may be any type of key used for user data authentication, including, but not limited to, 1024-bit, 2048-bit, and 4096-bit Digital Signature Algorithm (DSA) and/or RSA public and private keys. The type of hash may be any type of cryptographic hash function, including, but not limited to, the MD5 and/or the SHA-1 hash functions. The classification level may be any identifier to describe the level of classification of digital file 130 such as unclassified, confidential, secret, top secret, and the like.

Guards 110 are communicatively coupled to remote network 115 and local networks 120. In general, remote network 115 and local networks 120 may include at least a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of the preceding. According to one embodiment, remote network 115 and local networks 120 may represent a geographically dispersed network. It should be noted, however, that although remote network 115 is depicted in FIG. 1A as residing outside top secret zone 102 and unclassified zone 104, a portion or all of remote network 115 may be physically located in one or both zones.

In operation, guards 110a and 110b reside between local networks 120 and remote network 115 and provide data integrity and authentication functions for data files 130 sent between top secret zone 102 and unclassified zone 104. In order to send digital file 130 from top secret zone 102 to unclassified zone 104, a user 125 sends and/or identifies digital file 130 to guard 110a that user 125 wishes to send. User 125 also sends and/or selects various user inputs 135 that guard 110a uses to label digital file 130 and verify that the file has been authorized for release to remote network 115. Once guard 110a releases digital file 130 to remote network 115, digital file 130 travels to guard 110b in unclassified zone 104. Guard 110b receives digital file 130 and performs validation functions to ensure digital file 130 has not be altered since being labeled and released by guard 110a. Once digital file 130 has been validated, guard 110b may remove the labels appended to digital file 130 by guard 110a and may make digital file 130 available to users 125 in unclassified zone 104.

Figure 1B:
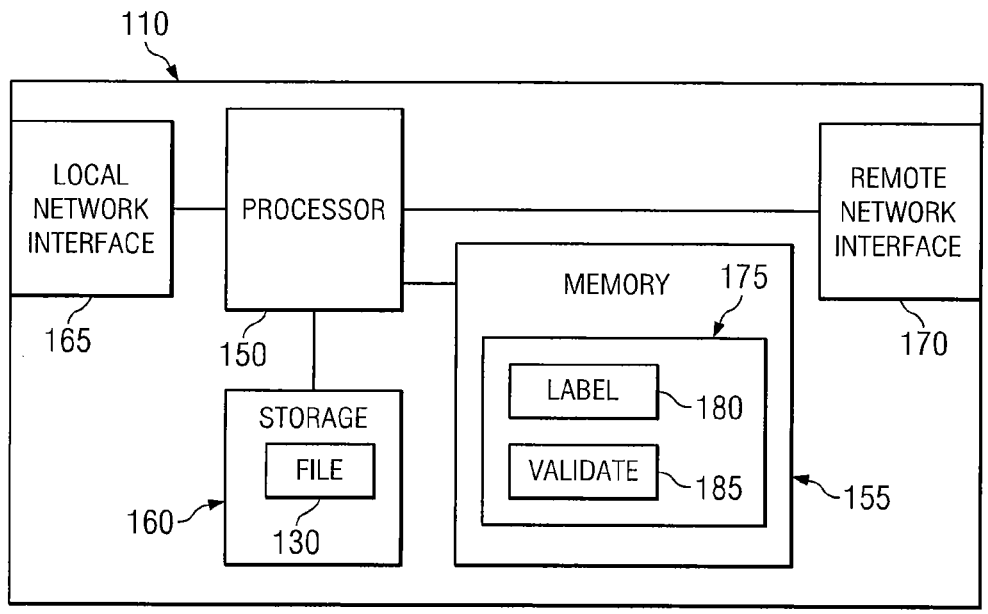

Guards 110 may be any device that performs data integrity and authentication functions in accordance with the disclosure. For example, FIG. 1B depicts a particular embodiment of guard 110 that may be utilized as guards 110a and 110b in system 100 discussed above in connection with FIG. 1A. With reference to FIG. 1B, guard 110 includes a processor 150, a memory device 155, a storage device 160, a local network interface 165, a remote network interface 170, and a guard routine 175. Guard routine 175 may reside in memory device 155 and includes a label function 180 and a validate function 185. Processor 150 is coupled to memory device 155, storage device 160, local network interface 165, and remote network interface 170, and may refer to any suitable device operable to execute instructions and manipulate data to perform operations for guard 110. Processor 150 may include, for example, any type of central processing unit (CPU).

Guard routine 175 may refer to any suitable logic embodied in computer-readable media, that when executed, is operable to perform data integrity and authentication functions in accordance with the disclosure. According to one embodiment of the disclosure, guard routine 175 includes label function 180 and validate function 185. Label function 180 includes logic that accepts a digital file such as digital file 130 and user inputs such as user inputs 135, and creates a header label and one or more signature labels that are appended to digital file 130. Validate function 185 includes logic that analyzes labeled digital file 130 to determine if digital file 130 has been modified since the header label and one or more signature labels were applied by label function 180. Label function 180 and validate function 185 are described in more detail below.

Memory device 155 may refer to any suitable device operable to store and facilitate retrieval of data. Memory device 155 may comprise Random Access Memory (RAM), Read Only Memory (ROM), a magnetic drive, a disk drive, a Compact Disk (CD) drive, a Digital Video Disk (DVD) drive, removable media storage, any other suitable data storage medium, or a combination of any of the preceding. Although guard routine 175, label function 180, and validate function 185 are illustrated as residing in memory device 155, guard routine 175, label function 180, and validate function 185 may be located in one or more memory devices 155. Similarly, storage device 160 may refer to any suitable device operable for storing data and instructions, such as digital file 130. Storage device 160 may be any one or a combination of the preceding memory devices, or other suitable data storage device.

Local network interface 165 and remote network interface 170 may refer to any suitable device operable to receive input for guard 110, send output from guard 110, perform suitable processing of the input or output or both, communicate to other devices, or any combination of the preceding. Local network interface 165 and remote network interface 170 may include appropriate hardware (e.g. modem, network interface card, etc.) and software, including protocol conversion and data processing capabilities, to communicate through a LAN, WAN, or other communication system that allows guard 110 to communicate to other devices. Local network interface 165 and remote network interface 170 may include one or more ports, conversion software, or both.

In operation, guard 110 performs data integrity and authentication functions on data files 130 before and after exposure to remote network 115. To begin, processor 150 executes guard routine 175, which may be residing in memory device 155. Guard routine 175 first executes label function 180. An example labeling method that label function 180 may perform is described in more detail below in reference to FIG. 3. Label function 180 first receives digital file 130 and user inputs 135 from user 125 via local network interface 165. Additionally or alternatively, label function 180 may receive digital file 130 from storage device 160. Label function 180 analyzes digital file 130 and appends a header label to the beginning of digital file 130 that may comprise information such as the length of unmodified digital file 130, a unique identifier, the version of label function 180 that was used to create the header label, and the classification level as specified by user 125 in user inputs 135. Once the header label is appended to the file, label function 180 hashes digital file 130 (i.e., label function 180 hashes the header label and the original contents of digital file 130) according to the type of hash specified by user 125 in user inputs 135 to create a first hash value. In some embodiments, label function 180 may then use the private key and password supplied by user 125 in user inputs 135 to digitally sign the first hash value and create a digital signature. Label function 180 may then create a signature label containing the first hash value and/or digital signature and append the signature label to the end of digital file 130. The modified digital file 130 may then be released to remote network 115 by guard 110 via remote network interface 170.

In some embodiments, digital file 130 may be passed more than one time through label function 180 so that multiple signature labels may be added to the end of digital file 130. For example, multiple users 125 in top secret zone 102 may be required to approve of the release of digital file 130 to unclassified zone 104. In such a case, each user 125 would separately supply label function 180 a private key and password via user inputs 135. Label function 180 would subsequently create a signature label for each user 125 and append each signature label to the end of digital file 130. Guards 110 may then examine the one or more signature labels at the end of digital file 130 to determine if digital file 130 has been properly authorized for release to unclassified zone 104 prior to transmitting digital file 130 to remote network 115. In this way, guards 110 authenticate digital files 130 prior to releasing digital files 130 from top secret zone 102.

Validate function 185 is executed by guard routine 175 on processor 150 in order to validate digital file 130 after digital file 130 has been labeled by label function 180 and subsequently exposed to a foreign environment such as remote network 115. An example validation method that validate function 185 may perform is described in more detail below in reference to FIG. 4. To begin, validate function 185 receives previously labeled digital file 130 from remote network 115 via remote network interface 170 and/or storage device 160. Validate function 185 re-hashes labeled digital file 130 (i.e., validate function 185 hashes the header label and the original contents of digital file 130 again) according to the type of hash specified by user 125 in user inputs 135 to create a second hash value. Validate function 185 also retrieves the first hash value that was previously created by label function 180 and appended to digital file 130. Validate function 185 locates and reads the unsigned first hash value in the signature label appended to the end of digital file 130, or, if the first hash value was originally signed by label 180, validate function 185 may un-sign the signature to obtain the first hash value. Validate function 185 then compares the first hash value and the second hash value. If the first hash value equals the second hash value, validate function 185 "validates" digital file 130 to declare that digital file 130 has been unmodified since digital file 130 was labeled by label function 180. If, on the other hand, the first hash value does not equal the second hash value, validate function 185 declares digital file 130 as not validated.

In some embodiments, digital file 130 may be labeled with more than one signature label. In such embodiments, validate function 185 may be executed once by guard routine 175 for each signature label appended to digital file 130. For example, if digital file 130 contains two signature labels, validate function 185 may be executed twice: once to analyze the hash value contained in the first signature, and once to analyze the hash value contained in the second signature. If each hash value contained in every signature label equals the second hash value created by validate function 185 after digital file 130 has been exposed to a foreign environment, validate function 185 "validates" digital file 130 to declare that digital file 130 has been unmodified since digital file 130 was labeled by label function 180. If, on the other hand, the hash value retrieved from any signature label does not equal the second hash value, validate function 185 declares digital file 130 as not validated.

Once validate function 185 successfully validates digital file 130, Guard 110 may then remove all modifications that were made to digital file 130 in order to restore digital file 130 to its original state. Guard 110 may then release digital file 130 to users 125 in unclassified zone 104 via local network interface 165.

Figure 2B:
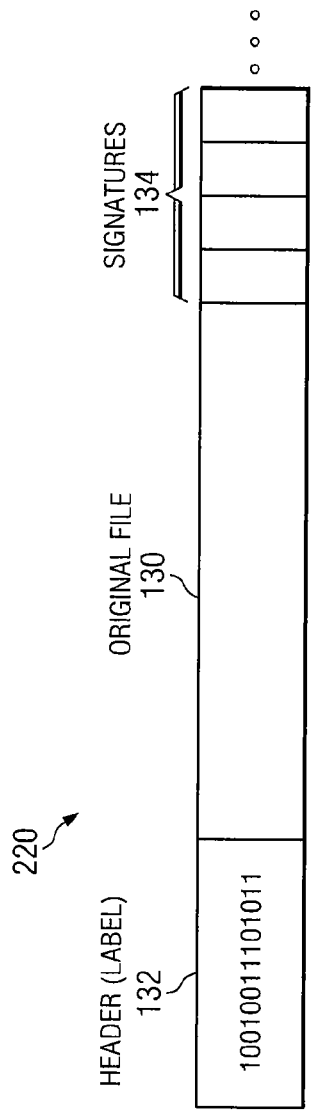
FIGS. 2A and 2B illustrate various representations of modifications to a digital file in accordance with a particular embodiment of this disclosure.
Figure 2A:
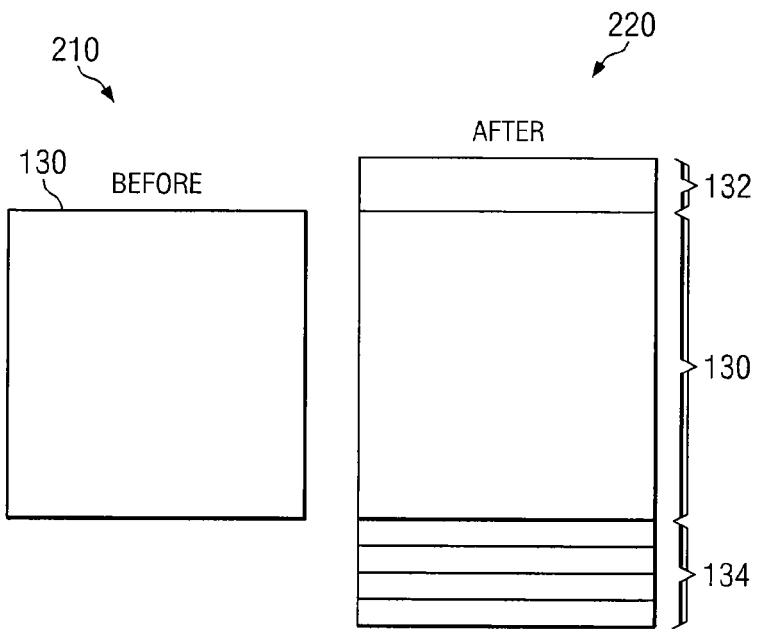

The modifications to digital file 130 by label function 180 prior to exposing digital file 130 to remote network 115, including the appended header label and one or more signature labels, are graphically depicted in FIGS. 2A and 2B.

FIG. 2A illustrates a before modifications state 210 and an after modifications state 220. Before modifications state 210 includes digital file 130 that is unmodified from its original state. After modification state 220 includes header label 132, digital file 130, and one or more signature labels 134, and represents a format of digital file 130 after it has been modified by label function 180. As discussed above in reference to FIG. 1B, label function 180 may create and append header label 132 to the beginning of digital file 130, and may create and append one or more signature labels 134 to the end of digital file 130. These modifications are also graphically depicted in FIG. 2B. Here, after modifications state 220 is depicted as a string of bits. Just as in FIG. 2A, header label 132 is a string of bits that is appended to the beginning of digital file 130, and the one or more signature labels 134 are strings of bits appended to the end of digital file 130.

Label function 180 may implement any method in order to apply header label 132 and one or more signature labels 134 to digital file 130 according to the teaching of the disclosure. One such method is described below in reference to FIG. 3.

Figure 3:
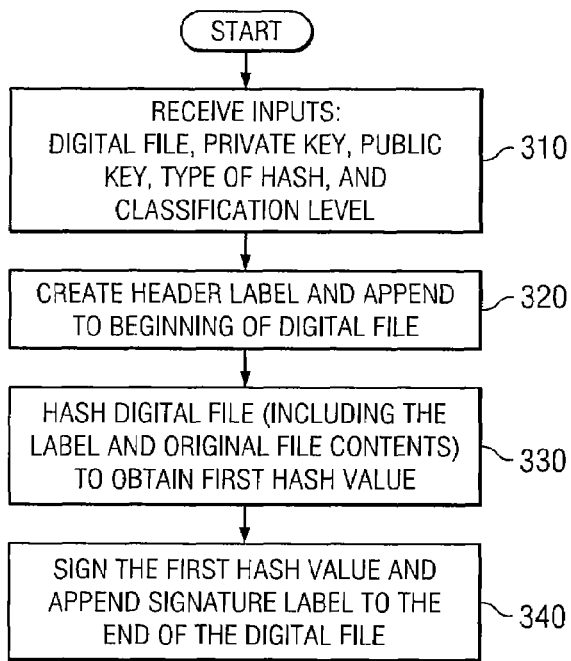
FIG. 3 is a flow chart illustrating a digital file labeling method in accordance with a particular embodiment of this disclosure.

FIG. 3 is a schematic diagram depicting an example digital file labeling method 300 that may be implemented by label function 180 as discussed above to label digital file 130 prior to digital file 130 being exposed to a foreign environment. Digital file labeling method 300 begins in STEP 310 where user inputs 135 are received. User inputs 135 may include a digital file 130, a private key, a public key, a type of cryptographic hash, a classification level, and the like. After receiving user inputs 135, digital file labeling method 300 proceeds to STEP 320 where a header label 132 is created. The header label 132 created in STEP 320 may comprise inputs received in STEP 310 and may be, for example, header label 132 as described above in reference to FIGS. 2A and 2B. After header label 132 is created, digital file labeling method 300 appends header label 132 to the beginning of the digital file 130 received in STEP 310.

Next, digital file labeling method 300 proceeds to STEP 330. In STEP 330, digital file labeling method 300 hashes digital file 130, including header label 132 that was applied in STEP 320, to obtain a first hash value. Digital file labeling method 300 may use a type of cryptographic hash according to the type of cryptographic hash in user inputs 135 in STEP 310 to obtain the first hash value. Alternatively, digital file labeling method 300 may use a predefined type of cryptographic hash to obtain the first hash value. Finally, in STEP 340 digital file labeling method 300 digitally signs the first hash value using the private key input received in STEP 310 to create a digital signature. A signature label 134 containing the first hash value and/or digital signature is then created and appended to the end of digital file 130. In some embodiments, the first hash value may not be signed before it is appended to the end of digital file 130 in signature label 134.

Once digital file labeling method 300 has labeled digital file 130, digital file 130 may receive one or more additional signature labels 134 by digital file labeling method 300 and/or it may be transmitted to a remote location where it is received and analyzed in order to be validated. An example validation method is described below in reference to FIG. 4.

Figure 4:
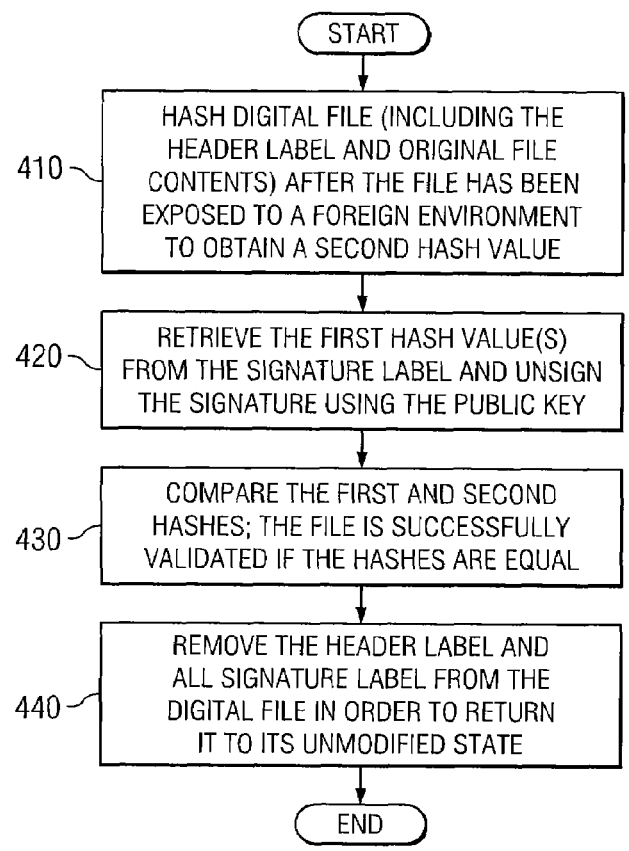
FIG. 4 is a flow chart illustrating a digital file validation method in accordance with a particular embodiment of this disclosure.

FIG. 4 illustrates a digital file validation method 400 that may receive and analyze digital file 130 that has been labeled by digital file labeling method 300. Digital file validation method 400 may be implemented by validate function 185 in guard 110 as discussed above in connection with FIG. 1B.

Digital file validation method 400 begins in STEP 410. In this step, digital file validation method 400 re-hashes digital file 130 that has been previously labeled by digital file labeling method 300 and then subsequently exposed to a foreign environment. Similar to STEP 330 in FIG. 3, digital file validation method 400 in STEP 410 hashes header label 132 and the original digital file 130 to determine a second hash value. Next, in STEP 420, digital file validation method 400 retrieves the first hash value from signature label 134 that was created by digital file labeling method 300. If the first hash value was originally signed and the signature was placed in signature label 134 that was appended to the end of digital file 130 by digital file labeling method 300, then digital file validation method 400 un-signs the signature using the public key in order to receive the first hash value where possible. If signature algorithms such as DSA are used, for example, a like comparison is still performed, but an "un-signing" is not performed. If, however, digital file labeling method 300 did not originally sign the first hash value, then digital file validation method 400 simply retrieves the first hash value from signature label 134. Next, digital file validation method 400 proceeds in STEP 430 to compare the first hash value and second hash value. If the first hash value equals the second hash value for each set of hash values/digital signatures within signature label(s) 134, digital file validation method 400 declares digital file 130 as "validated." If, however, the first hash value does not equal the second hash value for any set of hash values/digital signatures within signature label(s) 134, digital file validation method 400 does not validate digital file 130. Finally, in STEP 440 digital file validation method 400 may remove header label 132 and signature label(s) 134 from digital file 130 in order to restore digital file 130 to its original/unmodified state.

While the embodiments in the disclosure have been described in detail, numerous changes, substitutions, variations, alterations, and modifications may be ascertained by those skilled in the art. For example, FIG. 1A depicts two separate classification zones—top secret zone 102 and unclassified zone 104. In other embodiments, however, there may be more than two classification zones, and/or there may be zones that are distinct in ways other than classification level. Similarly, FIGS. 1A and 1B indicate that users 125 interface with guards 110 via local networks 120. In some embodiments, however, users 125 may directly interface with guards 110 without going through local networks 120. It is intended that the present disclosure encompass all such changes, substitutions, variations, alterations and modifications as falling within the spirit and scope of the appended claims.

What is claimed is:

1. A method of verifying integrity of a digital file comprising:
    labeling, in a first network, the digital file prior to exposure to a foreign environment, the first network having a first security classification level, wherein labeling comprises:
        creating a header label comprising an identification of the first security classification level;
        appending the header label to the digital file;
        hashing the digital file, together with the appended header label, to obtain a first hash value;
        signing the first hash value to create a digital signature;
        creating a signature label comprising one or both of the first hash value and the digital signature; and
        appending the signature label to the digital file; and
    validating, in a second network, the digital file subsequent to exposure to the foreign environment, the second network having a second security classification level that is different from the first security classification level, wherein validating comprises:
        hashing the digital file to obtain a second hash value;
        retrieving the first hash value from the signature label;
        comparing the first hash value and second hash value; and
        removing the signature label from the digital file.

2. The method of verifying integrity of a digital file of claim 1, the validating the digital file subsequent to exposure to the foreign environment further comprising removing the header label from the digital file.

3. The method of verifying integrity of a digital file of claim 1, further comprising:
    performing a second labeling, in the first network, on the digital file prior to exposure to the foreign environment, wherein labeling comprises:
        creating a second header label comprising an identification of a third security classification level;
        appending the second header label to the digital file;
        hashing the digital file, together with the second header label, to obtain a third hash value;
        signing the third hash value to create a second digital signature;
        creating a second signature label comprising one or both of the third hash value and the second digital signature; and
        appending the second signature label to the digital file.

4. The method of verifying integrity of a digital file of claim 1, further comprising:
    verifying, before release to the foreign environment, that the digital file has been authorized for release to the foreign environment.

5. The method of verifying integrity of a digital file of claim 4, wherein verifying comprises:
    hashing the digital file to obtain a third hash value;
    retrieving the first hash value from the signature label; and
    comparing the first hash value and third hash value.

6. A method of verifying integrity of a digital file comprising:
    labeling the digital file prior to exposure to a foreign environment, wherein labeling comprises:
        creating a header label comprising an identification of a security classification level of a network;
        appending the header label to the digital file;
        hashing the digital file, together with the appended header label, to obtain a first hash value;
        signing the first hash value to create a digital signature;
        creating a signature label comprising one or both of the first hash value and the digital signature; and
        appending the signature label to the digital file.

7. The method of verifying integrity of a digital file of claim 6, further comprising:
   validating the digital file subsequent to exposure to the foreign environment, wherein validating comprises:
     hashing the digital file, together with the appended header label, to obtain a second hash value;
     retrieving the first hash value from the signature label; and
     comparing the first hash value and second hash value.

8. The method of verifying integrity of a digital file of claim 7, further comprising removing the signature label from the digital file after validating the digital file.

9. The method of verifying integrity of a digital file of claim 7, wherein validating the digital file subsequent to exposure to the foreign environment further comprises removing the header label from the digital file.

10. The method of verifying integrity of a digital file of claim 6, wherein appending the signature label to the digital file renders the digital file unreadable until the signature label is removed from the digital file.

11. A method of verifying integrity of a digital file comprising:
   receiving, in a first network, the digital file subsequent to exposure to a foreign environment, the first network having a first security classification level, the digital file comprising:
     an appended header label comprising an identification of a second security classification level of a second network, the second security classification level being different from the first security classification level; and
     an appended signature label comprising one or both of a first hash value and a digital signature; and
   validating the digital file, wherein validating comprises:
     hashing the digital file, together with the appended header label, to obtain a second hash value;
     retrieving the first hash value from the signature label; and
     comparing the first hash value and second hash value.

12. The method of verifying integrity of a digital file of claim 11, further comprising:
   labeling the digital file prior to exposure to the foreign environment, wherein labeling comprises:
     hashing the digital file, together with the appended header label, to obtain the first hash value;
     signing the first hash value to create the digital signature;
     creating the signature label comprising one or both of the first hash value and the digital signature; and
     appending the signature label to the digital file.

13. The method of verifying integrity of a digital file of claim 11, further comprising removing the signature label from the digital file after validating the digital file.

14. The method of verifying integrity of a digital file of claim 13, wherein appending the signature label to the digital file renders the digital file unreadable until the signature label is removed from the digital file.

15. Logic encoded in non-transitory computer-readable media operable, when executed on a processor, to:
   label, in a first network, a digital file prior to exposure to a foreign environment, the first network having a first security classification level, wherein label comprises:
     creating a header label comprising an identification of the first security classification level;
     appending the header label to the digital file;
     hashing the digital file, together with the appended header label, to obtain a first hash value;
     signing the first hash value to create a digital signature;
     creating a signature label comprising one or both of the first hash value and the digital signature; and
     appending the signature label to the digital file; and
   validate, in a second network, the digital file subsequent to exposure to the foreign environment, the second network having a second security classification level that is different from the first security classification level, wherein validate comprises:
     hashing the digital file, together with the appended header label, to obtain a second hash value;
     retrieving the first hash value from the signature label; and
     comparing the first hash value and second hash value.

16. The logic encoded in computer-readable media of claim 15, further operable, when executed on a processor, to remove the signature label from the digital file after validating the digital file.

17. The logic encoded in computer-readable media of claim 15, wherein appending the signature label to the digital file renders the digital file unreadable until the signature label is removed from the digital file.

18. The logic encoded in computer-readable media of claim 15, wherein validating the digital file subsequent to exposure to the foreign environment further comprises removing the header label from the digital file.

* * * * *

UNITED STATES PATENT AND TRADEMARK OFFICE
CERTIFICATE OF CORRECTION

PATENT NO. : 8,621,223 B2
APPLICATION NO. : 12/164814
DATED : December 31, 2013
INVENTOR(S) : McDougal et al.

Page 1 of 1

It is certified that error appears in the above-identified patent and that said Letters Patent is hereby corrected as shown below:

In the Specification

In column 3, line 10, delete "155," and insert --115--, therefor

In column 3, line 12, delete "155." and insert --115.--, therefor

In column 3, line 42, delete "data" and insert --digital--, therefor

In column 4, line 53, delete "data" and insert --digital--, therefor

In column 5, line 49, after "label", insert --function--, therefor

Signed and Sealed this
Fifteenth Day of July, 2014

Michelle K. Lee
*Deputy Director of the United States Patent and Trademark Office*